June 17, 1969
S. O. NELSON
3,450,221
SPRING-BIASED, ADJUSTABLE, POWER-DRIVEN TRAIL ARM FOR VEHICLE
Filed Jan. 2, 1968
Sheet 1 of 3
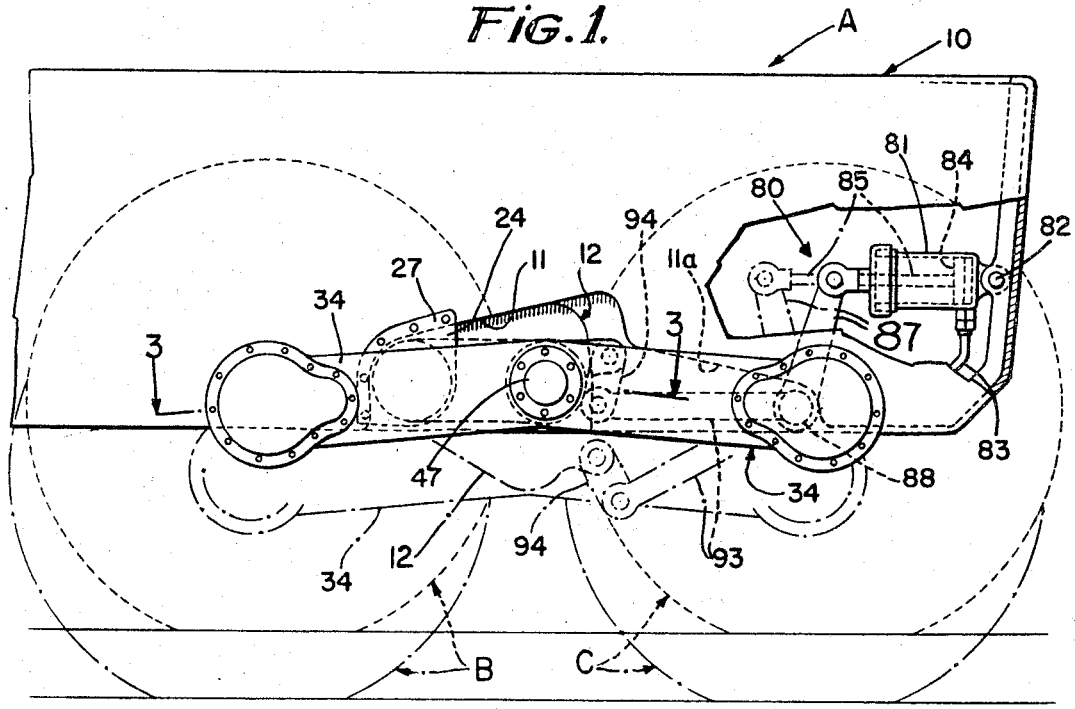
Fig. 1.
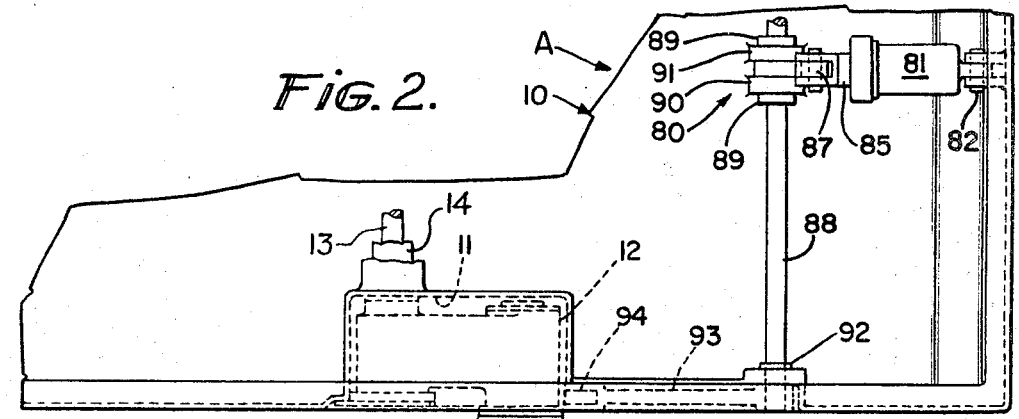
Fig. 2.
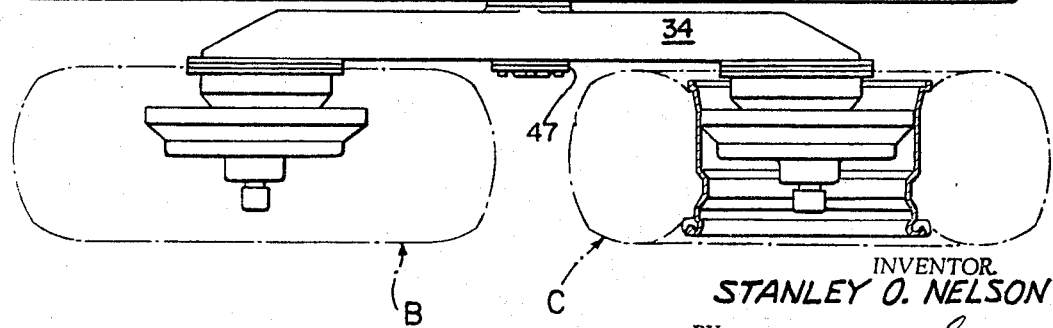
INVENTOR.
STANLEY O. NELSON
BY
George C. Sullivan
Agent

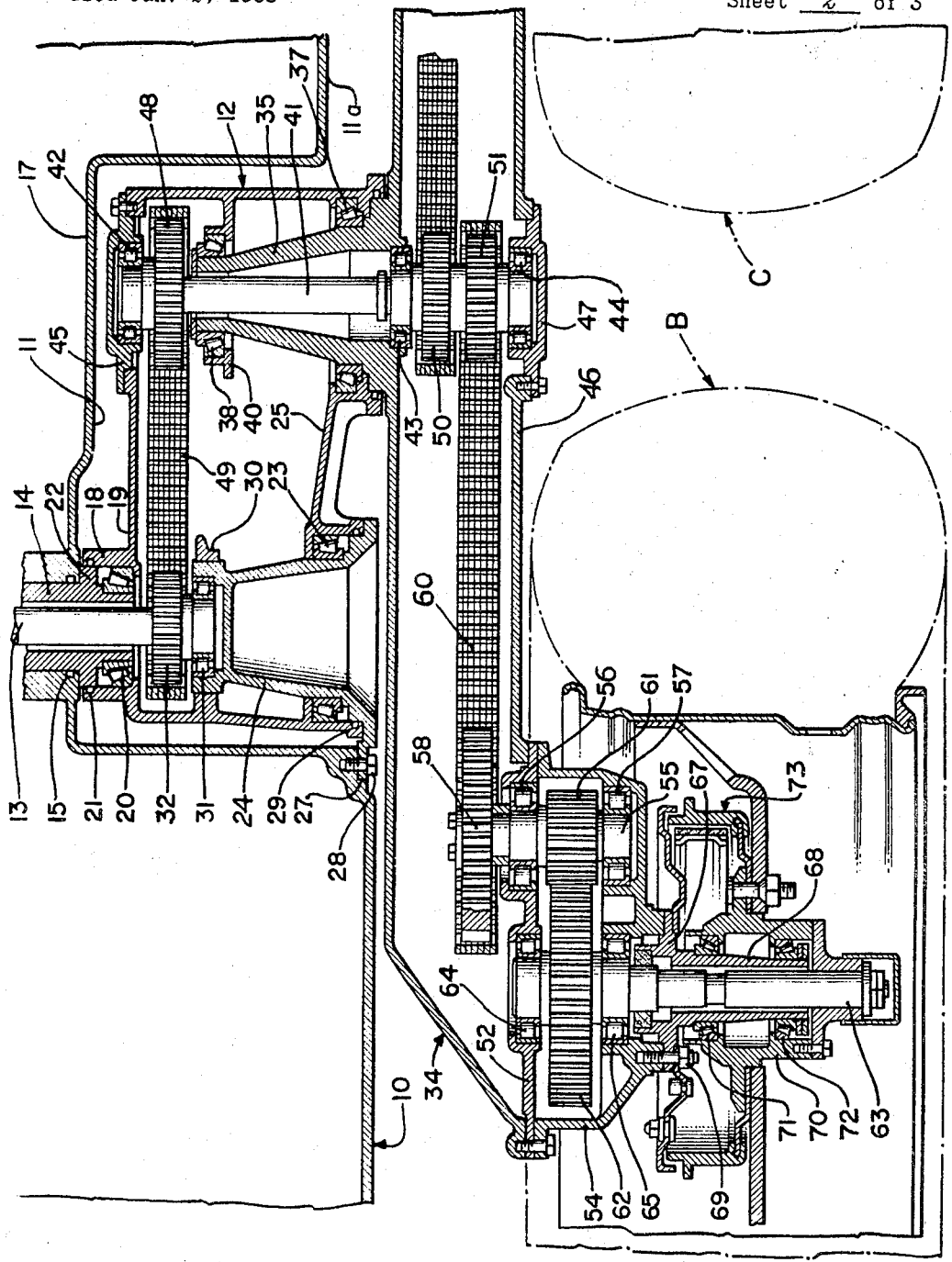

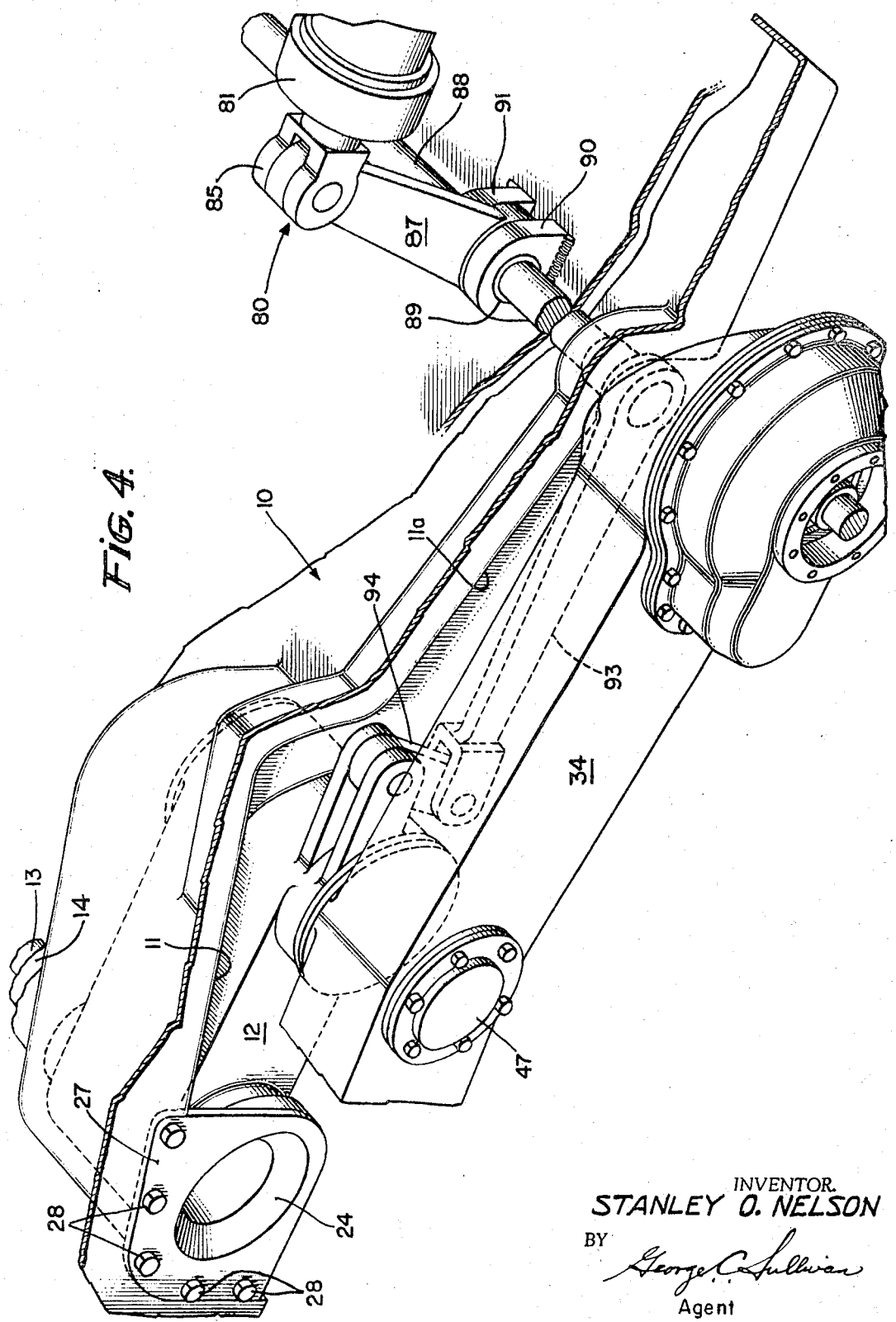

United States Patent Office 3,450,221
Patented June 17, 1969

3,450,221
SPRING-BIASED, ADJUSTABLE, POWER-DRIVEN
TRAIL ARM FOR VEHICLE
Stanley O. Nelson, Santa Clara, Calif., assignor to Lockheed Aircraft Corporation, Burbank, Calif.
Filed Jan. 2, 1968, Ser. No. 695,116
Int. Cl. B62d 61/00, 21/00, 21/14
U.S. Cl. 180—22          8 Claims

ABSTRACT OF THE DISCLOSURE

A pair of trail arm housings are pivotally mounted, one on each side of a vehicle, and the free end of each trail arm is connected by a link to an outboard lever arm mounted one on each end of a torsion spring rod which extends transversely across the vehicle. A power adjusted lever arm is secured to a central portion of the torsion rod, and the free end of this latter arm is connected to the piston rod of a hydraulic cylinder to adjust the position of the torsion rod, and thereby control the spring action and the height of the vehicle body. A pair of walking beam housings are fulcrumed, medially of their respective lengths, one on the free end of each trail arm housing, and a pair of support wheels are mounted in tandem, one on each end of each walking beam. For driving the wheels, a power drive shaft is mounted co-axially of the pivotal mounting of each trail arm housing, and a jack-shaft is journaled in the free end of each trail arm housing and extends into the associated walking beam housing with its axis coincident with the fulcrum of each walking beam on its associated trail arm housing. Each jack-shaft has driven connection with the power drive shaft, and in turn has driving connection, preferably through reduction gearing, with its associated pair of support wheels.

Prior art

In the past, vehicles, particularly those which were designed for carrying heavy loads over rough terrain, have used walking beams with tandem, power driven wheels mounted on trail arms which were adjustable from one fixed position to another while the vehicle was at rest, for the purpose of varying the wheel base. However, no known prior structure is similar to, or has the flexibility and effectiveness of performance of, the present invention.

Objects of the invention

An object of the preesnt invention is to provide a vehicle suspension comprising a pair of spring biased, adjustable-in-transit trail arms, with a walking beam journaled on the free end of each trail arm, and a pair of support wheels mounted in tandem, one on each end of each walking beam.

Another object of the invention is to provide such a vehicle with power drive means to each of the support wheels, preferably through gear reduction means.

Another object of the invention is to provide a vertically adjustable trail arm, walking beam, tandem wheel suspension for a heavy duty vehicle, adjustable spring means being provided to adjust for varying load conditions of the vehicle, and for selectively elevating and lowering the body of the vehicle while the vehicle is in transit.

The foregoing objects and advantages of the invention will be apparent from the following description and the accompanying drawings, wherein:

FIG. 1 is a fragmentary, side, elevational view of an end portion of a vehicle embodying the invention, the dot-dash lines showing the trail arm adjusting mechanism actuated to elevate the body of the vehicle, portions being broken away.

FIG. 2 is a fragmentary, top, plan view of the near side of the portion of the vehicle illustrated in FIG. 1, portions being broken away.

FIG. 3 is an enlarged, fragmentary, sectional view taken along line 3—3 of FIG. 1.

FIG. 4 is a similarly enlarged, fragmentary, perspective view of the trail arm housing and other portions of the suspension mechanism shown in FIGS. 1–3, portions being broken away.

Referring to the drawings in detail, a vehicle A comprises a box-like body 10 with a downwardly open recess 11 in each side thereof to receive a pair of trail arm housings 12, one in each of the recesses.

Since the trail arm housings and the rest of the vehicle suspension mechanism associated therewith are the same on both sides of the vehicle A, with the exception that one side is reversed from the other, the mechanism on the left hand side only of the vehicle is illustrated and described herein.

A power drive shaft 13 is driven by a suitable prime mover, such as an internal combustion engine, not shown, preferably through conventional differential gearing, also not shown, and is housed in a housing 14 which may be generally similar to a conventional motor truck axle housing. A usual sealing ring 15 (FIG. 3) is provided between the shaft housing 14 and a wall 17 defining the trail arm recess 11 to seal out dust, mud and water.

The trail arm housing 12 may be a hollow steel casting, and an annular flange 18 (FIG. 3) on one end of the inboard wall 19 thereof has a conventional roller bearing 20 (FIG. 3) seated co-axially therein, said bearing being mounted on the outboard end of the shaft housing 14. The term "inboard" as used herein means "toward the longitudinal center line of the vehicle," while "outboard" means the reverse.

A usual sealing ring 21 seals a radially projecting flange 22 on the drive shaft housing 14 to the trail arm housing flange 18.

The trail arm housing 12 is also journaled on a second roller bearing 23 (FIG. 3) which is mounted, co-axially with the shaft housing 14, on a generally conical bearing support member 24. The latter member also may be a steel casting, and is mounted on the vehicle body 10 to extend into an opening provided therefor in the outboard wall 25 of the trail arm housing 12. This conical bearing support member 24 has an integral mounting flange 27 along the top and front sides thereof, which, as best shown in FIG. 4, is fitted into a recess provided therefor in the vehicle body 10, where it is secured in position by cap screws 28. The conical bearing support member 24 is sealed to the trail arm housing 12 by a sealing ring 29.

The inboard end of the conical bearing support member 24 is fitted for rotative movement into a hole provided therefor in an inwardly projecting standard 30 formed integrally with the trail arm housing 12, and has journal support on a roller bearing 31 seated in a cup-shaped recess in its inboard end, said bearing being also fitted co-axially onto the outer end of the drive shaft 13. A chain drive gear or sprocket 32 is secured co-axially onto the drive shaft 13 between the bearings 20 and 31.

A walking beam housing 34 (FIG. 3) which also may be a steel casting, is fulcrumed, medially of its length, on the free end of the trail arm housing 12. A tapered, laterally projecting hub portion 35 is provided on the walking beam housing 34 medially of its length, and this hub portion 35 extends into, and has journal support on, the free end of the trail arm housing 12.

The journal support for the walking beam housing 34 comprises a pair of co-axial roller bearings 37 and 38, the common axis of which is parallel to that of the drive shaft 13. The outboard bearing 37 is seated on the base of the tapered hub portion 35 and is also fitted into a seat provided therefor in the outboard wall 25 of the trail arm housing 12. The inboard bearing 38 is seated on the inner end of the tapered hub portion 35 and is fitted into a seat provided therefor in a standard 40, which is integral with, and extends into the rear end of, the trail arm housing 12.

A jack shaft 41 is journaled co-axially within the conical hub portion 35 of the walking beam housing 34 in three co-axially aligned roller bearings 42, 43 and 44. The inboard jack shaft bearing 42 is fitted into a bearing cap 45 secured in an opening provided therefor in the inboard wall 19 of the trail arm housing 12, while the outboard bearing 44 is similarly fitted into a bearing cap 47 secured in an opening in the outboard wall 46 of the walking beam housing 34. The third jack shaft bearing 43 is fitted into a seat provided therefor co-axially within the outer end of the tapered hub 35.

A chain gear 48 is mounted on the jack shaft 41 in line with the chain gear 32 on the drive shaft 13, and a drive chain 49 passes around these two gears as shown in FIG. 3. A pair of chain gears 50 and 51 are also secured co-axially onto an outboard portion of the jack shaft 41, to lie within the walking beam housing 34.

The mounting arrangements for a pair of tandem support wheels B and C, one on each end of the walking beam housing 34, are similar to each other, and the structural details of the forward one only thereof are illustrated in FIG. 3. A mounting plate 52 for the mounting structure for the wheel B is secured in sealed relation to cover an opening provided therefor in the outboard wall 46 of the walking beam housing 34. A dished gear housing 54 is secured in sealed relation over the outboard side of the mounting plate 52.

A pinion shaft 55 is journaled in roller bearings 56 and 57, mounted co-axially in seats provided therefor in the plate 52 and the gear housing 54, respectively. The pinion shaft 55 projects into the walking beam housing 34, where a driven gear 58 is secured co-axially thereon. A drive chain 60 passes around this gear 58 and also the jack shaft gear 51, which is aligned therewith. A pinion 61 is mounted on the pinion shaft 55 between the roller bearings 56 and 57, and is in mesh with a driven gear 62. The latter is secured co-axially on a wheel spindle 63 journaled in roller bearings 64 and 65 which are fitted co-axially into seats provided therefor in the mounting plate 52 and the gear housing 54, respectively.

The radially flanged base 67 of a tapered, tubular wheel bearing support 68 is secured by cap screws 69 in an opening provided therefor in the gear housing 54 co-axially of the wheel spindle 63, and the conventional rubber tired support wheel B is mounted thereon. The wheel hub 70, bearings 71 and 72, brake mechanism 73 and other wheel parts are conventional and their structure and operation will be obvious to anyone familiar with the design and construction of truck-type vehicles. Since these wheel details are not per se features of the invention, they are not described in detail herein.

Body spring support and adjusting means 80 (FIGS. 1, 2 and 4) comprises a conventional hydraulic cylinder 81, pivotally mounted at 82 on the rear end of the vehicle body 10, said cylinder operatively communicating through a high pressure tube 83 and conventional hydraulic control valve means, the latter not shown, with a usual, highly pressurized supply of hydraulic fluid, also not shown. By varying the pressure exerted by the hydraulic fluid on a piston 84, mounted in conventional manner in the hydraulic cylinder 81, the piston rod 85 can be adjusted to any selected position between its solid line, fully retracted position of FIG. 1, and its dot-dash line, extended position shown in the same figure.

The outer end of the piston rod 85 is pivotally connected to the free end of a lever arm 87, which is secured to a central portion of a torsion spring rod 88. The latter rod is journaled in conventional bearing bushings 89 provided therefor in a pair of bearing standards 90 and 91 (FIG. 4) mounted in a central portion of the vehicle body 10 with one of the standards on each side of the lever arm 87.

The torsion rod 88 is also journaled in bearing bushings 92 (FIG. 2) seated in openings provided therefor, one in each side of the vehicle body 10. A pair of outboard lever arms 93 are also secured, one to each outboard end of the torsion rod 88, and the free end of each lever arm 93 is connected, by means of a link 94, to the free end of the trail arm housing 12 on the same side of the vehicle. A shallow recess 11a is provided in each side of the body 10 in communication with its associated trail arm recess 11 to receive the outboard lever arms 93 for free up-and-down swinging movement therein,. It will be obvious to any automotive design engineer that different types of springs may be employed, and that conventional shock absorbers may be provided if desired to control the spring action of the invention. Since the details of the spring means are not, per se, a feature of the invention, such modifications are not illustrated or described herein.

*Operation*

The operation of the illustrative form of the invention is as follows:

When an increase of spring torsion is desired, pressurized fluid is admitted to the hydraulic cylinder 81 as required to force the piston 84 outwardly sufficiently to cause the torsion spring rod 88 to move the free end of the outboard lever arms 93 downwardly toward their dot-dash position in FIG. 1, thereby urging the free end of the associated trail arm housings 12 downwardly. The amount it will be necessary to move the piston 84 to achieve a desired result will depend upon several factors, such as the load imposed by the body 10 and its contents on the torsion spring rod 8, the nature of the terrain over which the vehicle is being driven, and the desired height of the vehicle body 10.

The "walk" or relative vertical displacement of the wheels B and C permitted by pivotal movement of the walking beam housing 34 tends to smooth out the effect of roughness in the terrain being traversed by the vehicle, as does also the action of the torsion spring rod 88. When it is desired to lower the silhouette of the vehicle to its minimum height, for example, to take advantage of available cover, or to minimize exposure to hostile fire in the case of a military vehicle, the piston 84 is retracted sufficiently to allow the trail arm housings 12 to engage the upper sides of their respective recesses 11 as shown in solid lines in FIG. 1.

The invention provides a simple and effective four wheel, trail arm and walking beam suspension for a heavy duty vehicle wherein a single drive or axle shaft, with or without conventional differential gearing as desired, drives all four wheels of the suspension, said suspension providing variable spring loading which is capable of selectively raising or lowering the height of the vehicle while the vehicle is in transit.

I claim:

1. A suspension mechanism for a vehicle having a power drive shaft extending transversely thereof, said suspension mechanism comprising,
 a pair of trail arm housings pivotally mounted, one on each outboard side of the vehicle, co-axially of the drive shaft for pivotal movement independently of each other,
 a walking beam housing fulcrumed medially of its length on the free end of each trail arm housing and outboard thereof for pivotal movement relative to each other and to said trail arm housing about a fulcrum parallel to the axis of the drive shaft,
 a pair of support wheels journaled in tandem, one on each end of each walking beam, drive means operatively interconnecting the drive shaft with at least one of the support wheels on each walking beam housing, and independent spring means acting between each trail arm housing and a vehicle element in a direction to urge the free end of each trail arm housing downwardly independently of the other trail arm housing, and powered adjusting means interposed between each said vehicle element and its spring means whereby selectively to vary the height of the vehicle.

2. A suspension mechanism for a vehicle having a power drive shaft extending transversely thereof, said suspension mechanism comprising, a pair of trail arm housings pivotally mounted, one on each outboard side of the vehicle, co-axially of the drive shaft for pivotal movement independently of each other, a walking beam housing fulcrumed medially of its length on the free end of each trail arm housing and outboard thereof for pivotal movement about a fulcrum parallel to the axis of the drive shaft, a pair of support wheels journaled in tandem, one on each end of each walking beam, a jack shaft for each trail arm housing, each jack shaft journaled with its axis co-incident with the fulcrum of each walking beam on its trail arm housing, and extending into the adjacent walking beam housing, first drive means operatively interconnecting the drive shaft and each jack shaft, second drive means operatively interconnecting each jack shaft and at least one of the support wheels, and independent spring means acting between each trail arm housing a vehicle element in a direction to urge the free end of each trail arm housing downwardly independently of the other trail arm housing.

3. A vehicle suspension mechanism as claimed in claim 2 wherein the drive shaft extends laterally outwardly into each trail arm housing, a drive sprocket is mounted on the drive shaft within each trail arm housing, a drive sprocket is mounted on the jack shaft within each of the trail arm and walking beam housings, a first drive chain passes around the sprockets on the drive shaft and the jack shaft which are within the trail arm housing to drive the jack shaft, a sprocket is mounted within the walking beam housing in driving relation with at least one of the support wheels on each walking beam, and a second drive chain passes around the jack shaft sprocket in each walking beam housing and also around the sprocket in said each walking beam housing which is in driving relation with said one support wheel, thereby to drive each said one support wheel.

4. A vehicle suspension mechanism as claimed in claim 3 wherein a second sprocket is mounted on the jack shaft in each walking beam housing, a separate sprocket is mounted in driving relation with said other wheel on each walking beam housing, and a third drive chain passes around said second sprocket and said separate sprocket in driving relation with said other wheel on each walking beam housing, thereby to simultaneously drive both support wheels on each walking beam.

5. A vehicle suspension mechanism as claimed in claim 3, wherein reduction gearing is operatively interposed between each sprocket which is in driving relation with said at least one support wheel and its support wheel.

6. A vehicle suspension as claimed in claim 3 wherein the sprocket which is mounted in driving relation with said at least one support wheel is mounted on a pinion shaft journaled in laterally offset, parallel relation to the axis of rotation of said one support wheel, a drive pinion is mounted on each pinion shaft, and a gear of larger diameter than the pinion is secured co-axially to said one wheel and in driven, meshed relation with the pinion for driven rotation of said one wheel from the drive shaft, and at a lesser speed than the drive shaft.

7. A vehicle suspension mechanism as claimed in claim 2 wherein the pivotal connection of each trail arm housing to the vehicle comprises a first bearing mounted on the vehicle and providing journal support for the inboard side of each trail arm housing, and a second bearing co-axial with said first bearing and mounted on the vehicle and providing journal support for the outboard side of each trail arm housing.

8. A vehicle suspension mechanism as claimed in claim 2 wherein a laterally extending hub is provided on one of the housings on each side of the vehicle with the axis of the hub co-incident with the fulcrum of the walking beam housing on the trail arm housing, said hub extending into the other of said housings, and bearing means in said other housing providing journal support for the hub.

References Cited

UNITED STATES PATENTS

| | | |
|---|---|---|
| 2,018,862 | 10/1935 | Meyer. |
| 2,298,282 | 10/1942 | Brown _____ 180—22 |
| 3,351,037 | 11/1967 | Meili _____ 180—23 X |
| 3,369,622 | 2/1968 | Thomas. |

FOREIGN PATENTS 765,616   1/1957   Great Britain.

KENNETH H. BETTS, *Primary Examiner.*

U.S. Cl. X.R.

180—85; 280—43.18, 104.5